Figure 1:
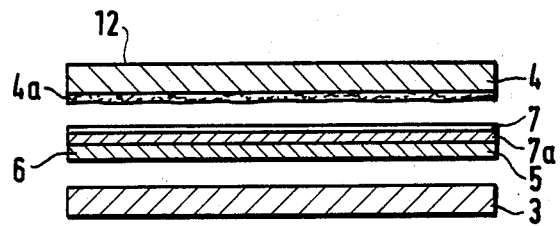

United States Patent [19]

Diekemper et al.

[11] Patent Number: 4,694,148
[45] Date of Patent: Sep. 15, 1987

[54] ACCESS CARD

[75] Inventors: Erwin Diekemper; Dieter Kastrup, both of Gutersloh, Fed. Rep. of Germany

[73] Assignee: MIDS Magnetische Informations-und Daten-Systeme GmbH, Fed. Rep. of Germany

[21] Appl. No.: 751,946

[22] Filed: Jul. 5, 1985

[30] Foreign Application Priority Data

Feb. 7, 1985 [DE] Fed. Rep. of Germany ....... 3504109
Mar. 20, 1985 [EP] European Pat. Off. ........ 85103216.9

[51] Int. Cl.⁴ .............................................. G06K 7/10
[52] U.S. Cl. .................................... 235/468; 235/487; 235/488
[58] Field of Search ......................... 235/468, 487, 488

[56] References Cited

U.S. PATENT DOCUMENTS 3,763,356 10/1973 Berler ................................... 235/468
3,786,237 1/1974 Postal .................................. 235/468
3,802,101 4/1974 Scanflin ............................... 235/468
3,873,813 3/1975 Lahr .................................... 235/468
4,605,846 8/1986 Duret ................................... 235/468

Primary Examiner—Harold I. Pitts
Attorney, Agent, or Firm—Reese Taylor

[57] ABSTRACT

In an access card having coded material which comprises a plurality of markings which under infrared radiation appear on an infrared receiver, it is provided in accordance with the invention in order to prevent counterfeiting that a continuous and transparent plastic foil or film blank (4), at least on a portion of its surface, has a layer (4a) that is not transparent to visible light and is transparent to infrared light; together with a substrate (5), the blank embodies a laminate which on its inside carries a photosensitive layer (7) covered by a layer that is transparent to infrared light. The markings (21-23) appear as a negative or positive on the photosensitive layer (7) as the result of exposure of the plastic foil or film blank (4) to light.

11 Claims, 4 Drawing Figures

ACCESS CARD

RELATED APPLICATIONS

This application claims priority under 35 U.S.C. 119 based on Federal Republic of Germany Application P35 04 109.9 filed Feb. 7, 1985 and European Application 85 1032 16.9 filed Mar. 20, 1985.

BACKGROUND OF THE INVENTION

The invention relates to an access card having encoded material as generically defined by the preamble to claim 1.

Access cards, according to the invention, provide the card holder with a code word that is not readily decipherable, with which either the card holder only or a number of card holders provided with the same code word, gains access, once the code word has been read out to some apparatus that can be unlocked only with the correct code word; the prerequisite is the possession of the appropriate access card. The use of infrared light to decipher the code prevents unauthorized used by switching off the short-wave radiation of visible light. Furthermore, the available technical infrared radiation emitters and receivers, even with the capacity required, are so small that they can be used together with electronic circuits, for instance being built into the locks of doors.

Accordingly, one example of a practical application of the invention is so-called key cards which are given to hotel guests instead of metal keys, and with which the lock of a hotel room is opened. These key cards are incomparably less expensive than conventional room keys and thus prevent the very considerable financial losses incurred by hotel owners and others when hotel guests intentionally or unintentionally fail to return their room key and instead take them along when they leave, or lose them. In these cases, as a rule, it is not enough merely to replace the lost key and have the usually locked hotel room opened by a locksmith. Instead, once opened, the lock must be removed and replaced with a new one to prevent subsequent unauthorized access. If the hotel owner uses key cards instead, then if they are lost there is practically no financial loss as a result. Furthermore, the door locks are embodied such that they can be reset for different code words. Thus, it becomes unnecessary to replace the lock if the key card is lost.

The invention is based on a previously known access card which is used, among other applications, in a system of the above-described special type. The code comprises a sequence of perforations in the card through which, in the lock, the beam of a built-in infrared emitter passes and strikes a receiver which uses an electronic circuit to decipher the code and then either opens the lock or keeps it closed. However, unauthorized use cannot be pecluded with these cards because the punch code is visible, and even without knowing the code word a counterfeiter can readily copy the code onto a counterfeit card, which need merely be a correspondingly perforated foil or film blank.

SUMMARY OF THE INVENTION

It is the object of the invention, by simple means and without changing the described system which substantially comprises an infrared emitter and receiver, to preclude such unauthorized uses which have been available to counterfeiters because of the simple design of the known access card.

In accordance with the invention, this object is attained with the characteristics of claim 1. Suitable embodiments of the invention are the subject of the dependent claims.

According to the invention, the code is disposed onto the access card in such a way as to pass through the coating layer that is not transparent to visible light, using the light for which the coating layer is transparent, for instance ultraviolet light. The code is recorded onto the photosensitive layer laminated within the access card. The coating layer renders the code illegible to the naked eye, especially in daylight. Using infrared light, for which the coating layer is transparent, the code may be read in the known manner using a suitable electronic circuit. Since the code is recorded in particular by illuminating the photosensitive layer laminated within the card, this layer is not accessible without destroying the card. In addition, one would also have to have the appropriate illuminating device to read the code recorded on the photosensitive layer. Counterfeits of the access card according to the invention thus cannot readily be made.

Laminated access cards are known from various applications and are as a rule composed of a plurality of layers joined together in such a manner that once the individual layers have been joined, they cannot be separated or even rejoined to one another, without destroying or cancelling the card. This also makes it impossible for the counterfeiter to use parts of the original card to make a counterfeit.

The invention makes it possible to continue to use the receivers and emitters already used for deciphering the code, without changing the system. In hotels, existing locks can, therefore, be retained unchanged or with only relatively readily attained electronic corrections. Only the recording of the code word onto the individual access cards requires equipment arranged for marking the photosensitive layer. Since the card, according to the invention, comprises a plurality of layers, it also offers the advantages of such an arrangement over cards comprising only one plastic foil or film blank. In particular, the card can be smooth on both sides and can also be printed on both sides; additionally, the printing can be protected with an overlay. These options are not limited by the invention because the photosensitive layer is required only at the location where the code word must already be recorded, in any case, in the known cards.

With the characteristics of claim 2, using luminous panel-type or point-source emitters, the focus of radiation of which should suitably be located in a definite plane of the card, the coded data can be recorded in the cards without distortion, despite the low optical quality of the plastic foil or film blank because whether used alone or with a mask, the beam does not allow the production of coded material that is adulterated by halation.

An application of the invention which is facilitated by comparison with the above is attained with the characteristics of claim 3. In this case, the mask is dispensed with, and again the markings of the coded material emerge in sharp definition and can, therefore, be disposed in great numbers on small areas, for instance.

With the characteristics of claim 4, a plastic card composed of a plurality of layers is produced which has an inlay in which the photosensitive layer is provided.

In this case there is the advantage that the conventional photosensitive layers can be used in the card, according to the invention, without substantial changes.

With the characteristics of claim 5, the inlay can be used not only for the photosensitive layer but also for other purposes, such as for reproducing visible data by means of printing.

Figure 2:
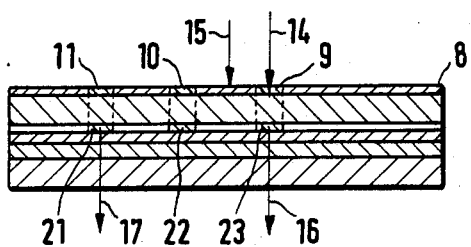
Figure 3:
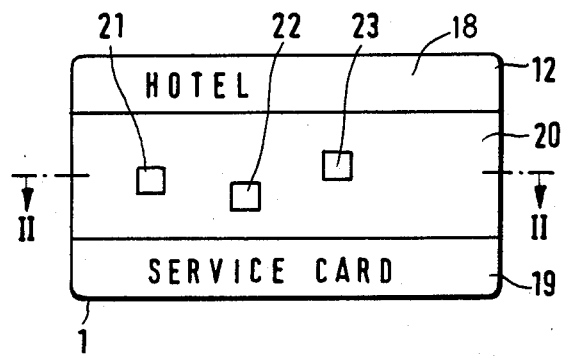

Details, further characteristics and other advantages of the invention will become apparent from the ensuing description of the exemplary embodiment taken in conjunction with the drawing figures; shown are:

OF THE DRAWINGS:

FIG. 1, in a side view, the various planes of an access card according to the invention prior to its being put together; that is, the blanks making up the card are shown spaced apart from one another;

FIG. 2, the finished access card, on which the effect of its being exposed to light has been shown in schematic form;

FIG. 3, a plan view on the access card shown in FIGS. 1 and 2; and

Figure 4:
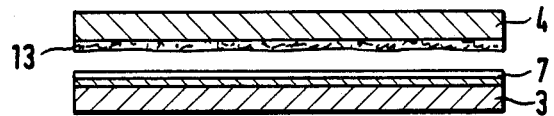

FIG. 4, a modified form of embodiment of the invention in a view corresponding to FIG. 2.

BRIEF DESCRIPTION OF THE PREFERRED EMBODIMENTS

As shown in FIG. 2, the access card generally designated in FIG. 3 as 1 comprises a plurality of parts. Two plastic foil or film blanks 3 and 4 of identical shape are coated continuously; that is, being neither perforated nor marked and, furthermore, either transparently or being nontransparent to visible light and transparent to infrared light on one side, as indicated at 4a. The foil or film blanks can, therefore, be irradiated by a technical infrared emitter. The two plastic blanks 3 and 4, or 4a, together embody the overlay which covers both sides of a further plastic foil or film blank 5 that embodies the so-called inlay. This element is a substrate which has a layer 7 of a photosensitive film on the side marked 6 which faces the plastic blank 4 of the overlay. This film is secured to the film 5 with the aid of an adhesive layer 7a.

By means of the local application of pressure and heat, the laminate shown in FIG. 1 and described above is prepared. A mask is shown schematically at 8 which, for instance, itself comprises a foil or film blank which, as a positive, reproduces the coded material designated 9-11. The mask 8 is placed upon the outside 12 of the plastic blank 4 and then subjected to a brief exposure to light by means of a panel-type thermal radiator, the focus of radiation of which is assumed in the drawing to be such that the rays extend approxmiately parallel. One of the rays schematically shown at 14 in FIG. 2 strikes a blackened area of the mask 8 and is, therefore, incapable of reaching the surface indicated by dot-dash lines of the photosensitive layer 4a which is therefore unaltered by the radiation. The further blackened areas shown at 10 and 11 on the positive behave in the same manner. Contrarily, other rays, one of which is designated as 15, are capable of passing through the mask because they strike a portion of the surface that has not been blackened. They alter the photosensitive layer 7 on the substrate in such a way that it becomes non-transparent to further infrared rays.

Rays are shown at 16 and 17 which pass through the card at the markings 21-22 produced on the layer 7 by the blackened areas of the mask whenever the card is illuminated by an infrared emitter in a lock. These rays strike a receiver and are picked up by a built-in electronic circuit, which deciphers the code and compares it with a memorized code word. If the deciphered code word agrees with the memorized code word, then the lock is unlocked; otherwise, it is kept closed.

As FIG. 3 shows, the coded material comprises a multiplicity of markings. At the same time, only a small portion 20 of the access card needs to be provided for reproducing the code. The photosensitive layer, therefore, does not need to comprise the entire surface area of the inlay; instead, large areas of the surface can be left free and, for instance, made available for printing. This is schematically shown at 18 and 19 in FIG. 3.

Deviating from the above, the access card in the exemplary embodiment shown in FIG. 4 comprises only two foil or film blanks 3 and 4, which are joined to make a laminate. The photosensitive layer 7 is then located on the film 3 or on the inside 13 of the film 4; whichever film 3 or 4 is located opposite the layer 7 is then, from the inside 13, always non-transparent to visible light and transparent to infrared light. In this case, it can either be disposed over the entire surface or, as described, over only a portion of the surface. The coded material can also be recorded on the sensitive layer without a mask, using a point-type radiation, which effects respective markings. In this case, the coded material is embodied in the card.

When a mask 8 is used, the coded material can be recorded in the card either as a positive or as a negative, depending on how the mask is embodied.

For reading the coded material, a layer is used which is transparent in the range between approximately 900 and 950 $\mu$m, that is, in the infrared range. The photosensitive layer 7, contrarily, is sensitive in the ultraviolet range to radiation of approximately 400 $\mu$m; that is, this radiation passes through the layer 4a which is transparent to infrared light and marks the photosensitive layer 7. Silver iodine can be used in this layer. In a temperature treatment at between 70° and 180° C. which immediately follows the marking of this layer, the photosensitive layer is fixed and thereby rendered insensitive to further markings.

What is claimed is:

1. An access card with recorded coded data including markings which appear on a radiation receiver when exposed to radiation, comprising:
   a first and a second continuous and transparent plastic foil or film blank;
   a layer of material arranged between said blanks, said material being non-transparent for visible light and transparent for infrared light and disposed on at least a portion of one surface of said first blank;
   a layer of photosensitive material (7) carried on at least a portion of one surface of said second blank;
   said first and second blanks forming a laminate with said layer that is transparent to infrared light covering said photosensitive layer; and
   the markings (21-23) appearing as negative or positive images on said photosensitive layer upon existing said blanks to a marking light.

2. The access card of claim 1 wherein a mask (8) carries the markings (21-23) as positive or negative images; said mask being superimposed on one of said first and second blanks; said images being transferrable substantially without distortion to said second blank.

3. The access card of claim 1 wherein said blanks carry an antireflection coating whereby substantially distortion free reproduction of the markings (21-23) on said photosensitive layer (7) is achieved.

4. The access card of claims 1, 2 or 3 wherein the markings (21-23) are reproduced on a point-type emitter whereby the markings are transferrable in point form through said blanks to said photosensitive layer.

5. The access card of claims 1, 2 or 3 wherein said second blank forms a substrate (5); and a third blank covers the surface of said substrate opposite said photosensitive layer.

6. The access card of claim 4 wherein said second blank forms a substrate (5); and a third blank covers the surface of said substrate opposite said photosensitive layer.

7. The access card of claim 1 wherein the portion of said second blank covered by said photosensitive layer (7) corresponds to a selected portion (20) of the surface (18-20) of the blank.

8. The access card of claim 1 wherein the layer which is transparent to infrared light is permeable to radiation in the range between approximately 900 and 950 $\mu$m.

9. The access card of claim 1 wherein said photosensitive layer is markable with radiation in the ultraviolet range at approximately 400 $\mu$m.

10. The access card of claim 1 wherein said photosensitive layer is subjected to a temperature treatment at between 70° and 180° C. to fix the markings (21-23).

11. An access card for receiving coded data readable by a radiation receiver presented to one side of the card when a radiation source is presented to the other side of the card, comprising:

a first continuous and transparent blank;

a coating disposed on at least a portion of one surface of said first blank, said coating being non-transparent to visible light and transparent to infrared light;

a second plastic blank;

photosensitive material carried on at least a portion of one surface of said second blank in opposition to said coating, said photosensitive material being alterable upon exposure to a light source; and said first and second blanks forming a laminate with said coating superimposed over said photosensitive material;

whereby the access card is encodable with data upon exposure to an encoding light source so as to alter said photosensitive material into distinct regions transparent to infrared light.

* * * * *

UNITED STATES PATENT AND TRADEMARK OFFICE
CERTIFICATE OF CORRECTION

PATENT NO. : 4,694,148

DATED : September 15, 1987

INVENTOR(S) : Erwin Diekemper and Dieter Kastrup

It is certified that error appears in the above-identified patent and that said Letters Patent are hereby corrected as shown below:

Col. 4, Line 60, after "upon" delete "existing" and substitute therefor --exposing--.

Signed and Sealed this

Ninth Day of February, 1988

Attest:

DONALD J. QUIGG

*Attesting Officer*  *Commissioner of Patents and Trademarks*